(12) United States Patent
Su

(10) Patent No.: US 8,097,819 B2
(45) Date of Patent: Jan. 17, 2012

(54) STRUCTURE FOR WIRE OUTLET COVERS

(75) Inventor: Der Sheng Su, Taipei (TW)

(73) Assignee: Tatung Company, Taiepei (TW)

( * ) Notice: Subject to any disclaimer, the term of this patent is extended or adjusted under 35 U.S.C. 154(b) by 254 days.

(21) Appl. No.: 12/654,914

(22) Filed: Jan. 8, 2010

(65) Prior Publication Data

US 2011/0061931 A1 Mar. 17, 2011

(30) Foreign Application Priority Data

Sep. 16, 2009 (TW) ................................ 98217062 U

(51) Int. Cl.
*H02G 3/18* (2006.01)
(52) U.S. Cl. ........ 174/665; 174/659; 174/650; 174/135; 174/152 R
(58) Field of Classification Search ................... 174/665, 174/659, 650, 669, 662, 658, 653, 135, 152 R; 439/271
See application file for complete search history.

(56) References Cited

U.S. PATENT DOCUMENTS

| | | | | |
|---|---|---|---|---|
| 3,130,260 A | * | 4/1964 | Gray | 174/152 R |
| 7,408,118 B2 | * | 8/2008 | Thompson | 174/135 |
| 7,728,235 B2 | * | 6/2010 | Mann | 174/650 |

* cited by examiner

*Primary Examiner* — Dhirubhai R Patel
(74) *Attorney, Agent, or Firm* — Bacon & Thomas, PLLC

(57) ABSTRACT

An improved structure for a wire outlet cover, arranged at a sidewall of a carton receiving a network wire, includes a body and a collar. The body has a hollow cylindrical shape and includes an inlet end and an outlet end, wherein the body is, at the outlet end, provided with plural stop blocks, and wherein the body is, near the outlet end, provided with a stop flange. The collar has a hollow annular shape and is, at its internal edge, provided with plural axially-extended edges. The collar is assembled to the rear body, with the plural axially-extended edges stopped by the plural stop blocks, such that the collar and the stop flange are spaced apart for a predetermined distance for receiving the sidewall of the carton. Therefore, the network wire will not be twisted when entering into the wire outlet cover nor be twisted around the inlet end.

9 Claims, 4 Drawing Sheets

STRUCTURE FOR WIRE OUTLET COVERS

BACKGROUND OF THE INVENTION

1. Field of the Invention

The present invention relates to an improved structure for wire outlet covers, more particularly, to an improved structure for a wire outlet cover adapted for network wiring.

2. Description of Related Art

As shown in FIG. 1, a perspective view illustrating a conventional wire outlet cover, the outlet end 81 of an wire outlet cover body 8 extends to outside of a carton 4, where a stop ring (not shown) of the body 8 stands and stops at interior of the carton 4. A collar 9 rotates, after passing through the outlet end 81 of the body 8, such that a T-arm 810 extending from the outlet end 81 can be stopped by a stop block 91 of the collar 9, and that the carton 4, at its sidewall, can be secured between the stop ring of the body 8 and the collar 9. However, for the conventional wire outlet cover, where the body 8 relates to a straight tube of circular section, the body 8 has a smaller bore for wire outgoing. This will cause a twist 31 of wire when outward introducing of a network wire 3, or even a winding of wire around an inlet of the wire outlet cover. As such, if a user pulls the network wire 3, with some extent of force, from outside of the carton 4, the network wire 3 would be bent, making damage to transmission property of the network wire 3.

As such, an improved structure for a wire outlet cover becomes a demand for consumers such that the wire outlet cover can have a smooth network wire outgoing without twist of, and damage to the transmission property of, the network wire.

SUMMARY OF THE INVENTION

The present invention is to provide an improved structure for a wire outlet cover, where the wire outlet cover is arranged at a sidewall of a carton which receives a network wire. The wire outlet cover comprises a body and a collar, wherein the body has a hollow taper cylindrical shape and includes an inlet end and an outlet end, where the body is, at the outlet end and at its external wall, provided with a plurality of stop blocks. Further, the body is, near the outlet end and at its external wall, provided with a stop flange so as to divide the body into a front body and a rear body. The collar has a hollow annular shape and is, at its internal edge, provided with a plurality of axially-extended edges. The collar is assembled to the rear body, with the plural axially-extended edges, flexibly, going over and stopped by the stop blocks, such that the collar and the stop flange are spaced apart for a predetermined distance for receiving the sidewall of the carton. Therefore, with the help of the hollow taper cylindrical body and the collar secured together on the sidewall of the carton in a simple manner, the network wire will not be twisted when entering into the wire outlet cover nor be twisted around the inlet end so as to prevent the transmission property of the network wire from being damaged.

According to the present invention, both the inlet end and the outlet end of the body are elliptical, and that the inlet end has a bore smaller than that of the outlet end so as to smooth outgoing of the network wire without causing a twist and damaging the transmission property of the network wire.

According to the present invention, the body is, at the inlet end, provided with an inward-extended flange having a curved edge so as to increase the strength of the body and to make the network wire enter into the wire outlet cover more smoothly.

The collar is, at its internal edge, provided with a plurality of axially-extended edges. The collar and the stop flange are spaced apart for a predetermined distance which conforms to thickness of the sidewall of the carton. In other words, the thinner the sidewall of the carton is, the higher the axially-extended edges are; and that the thicker the sidewall is, the lower the axially-extended edges are.

Further, the collar includes a wire-engagement hook, and that the body is, at the outlet end and corresponding to an internal side of the hook, provided with a recess, so that the network wire can be engaged and secured at the hook. The network wire, when not used, can go through the recess and be engaged and secured at the wire-engagement hook. This will prevent the network wire from being bent so as to greatly decrease damage to the transmission property of the network wire.

Still further, the collar is, at its upper surface, provided with at least one rib for reinforcing the collar.

According to the present invention, the wire outlet cover may be made of polyethylene so as to meet environmental requirements, and to have a desirable strength and durability.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
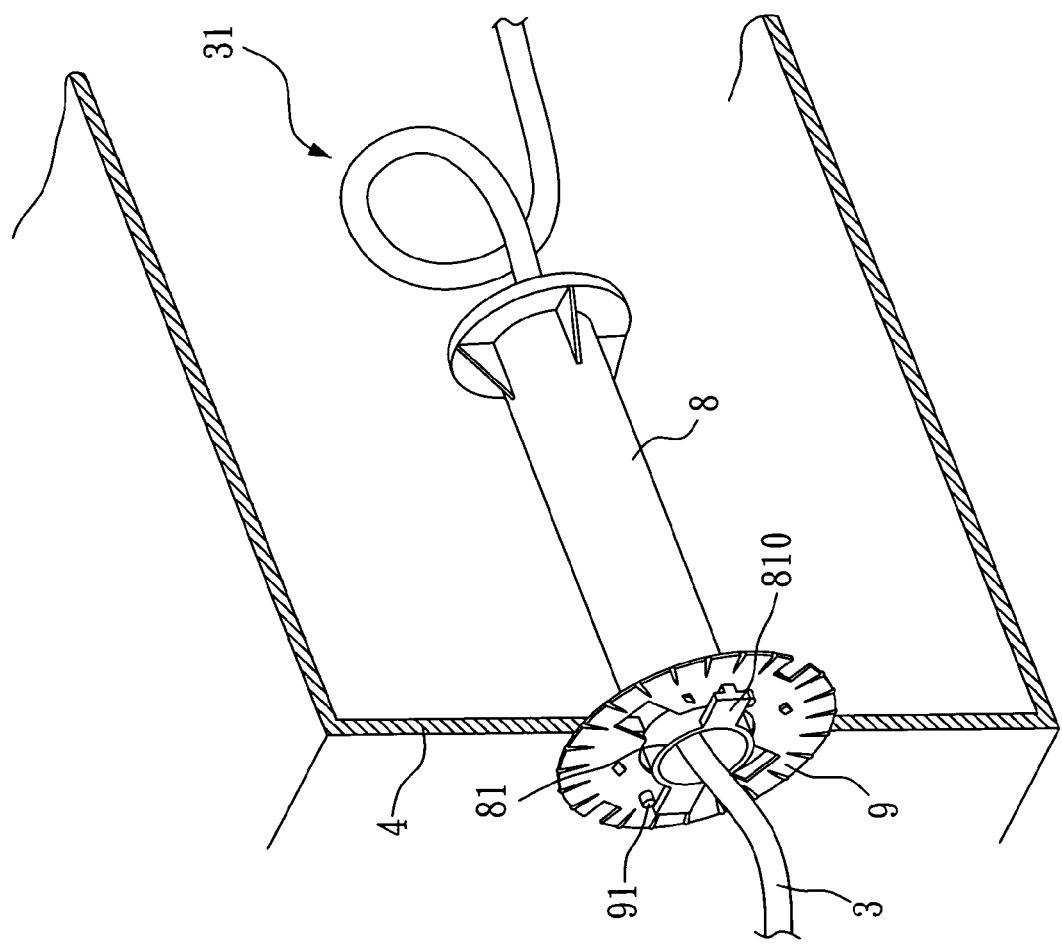
FIG. 1 is a perspective view illustrating a conventional wire outlet cover.
Figure 2:
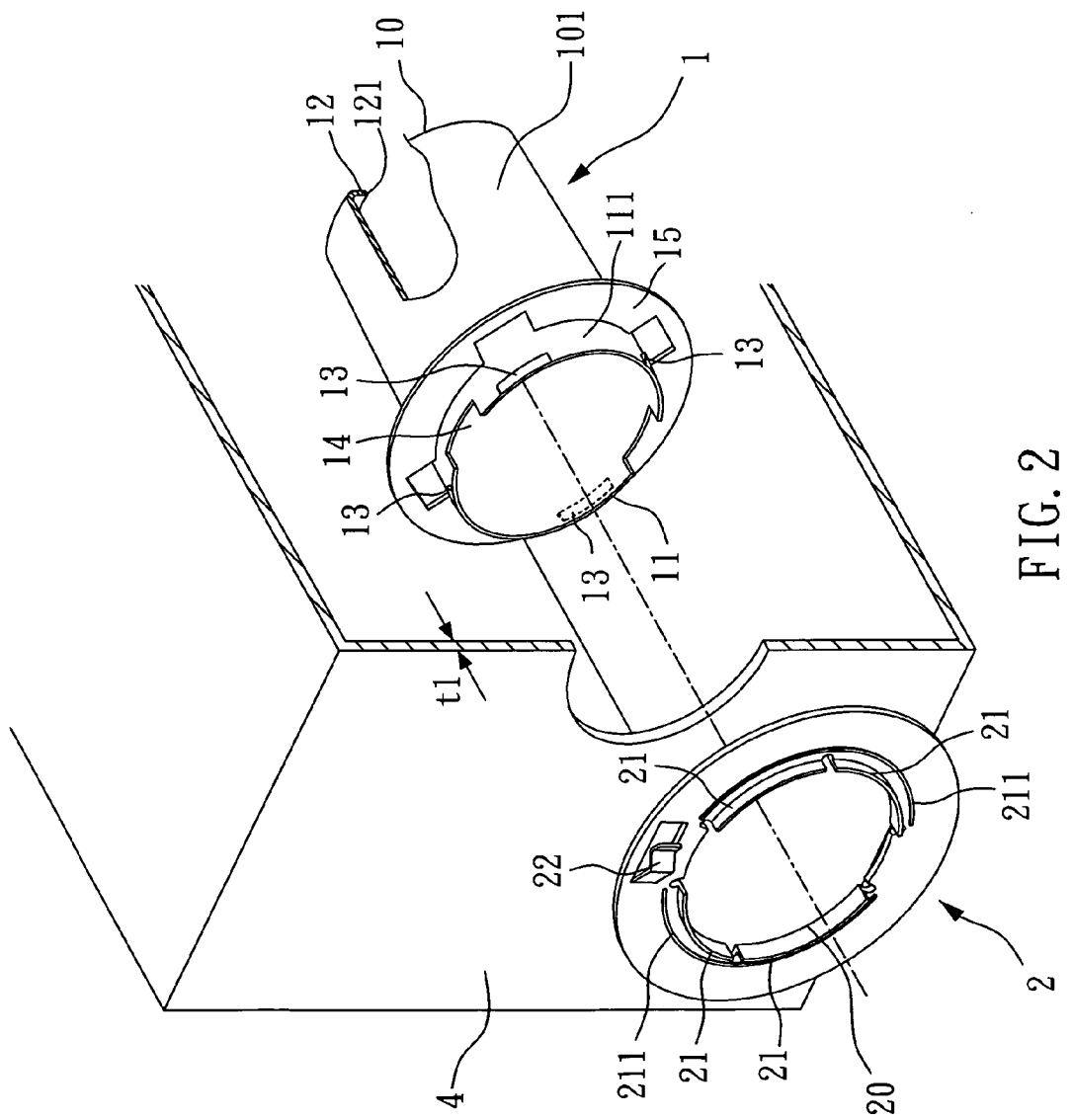
FIG. 2 is an exploded view illustrating an improved structure for a wire outlet cover according to a first embodiment of the present invention.
Figure 3:
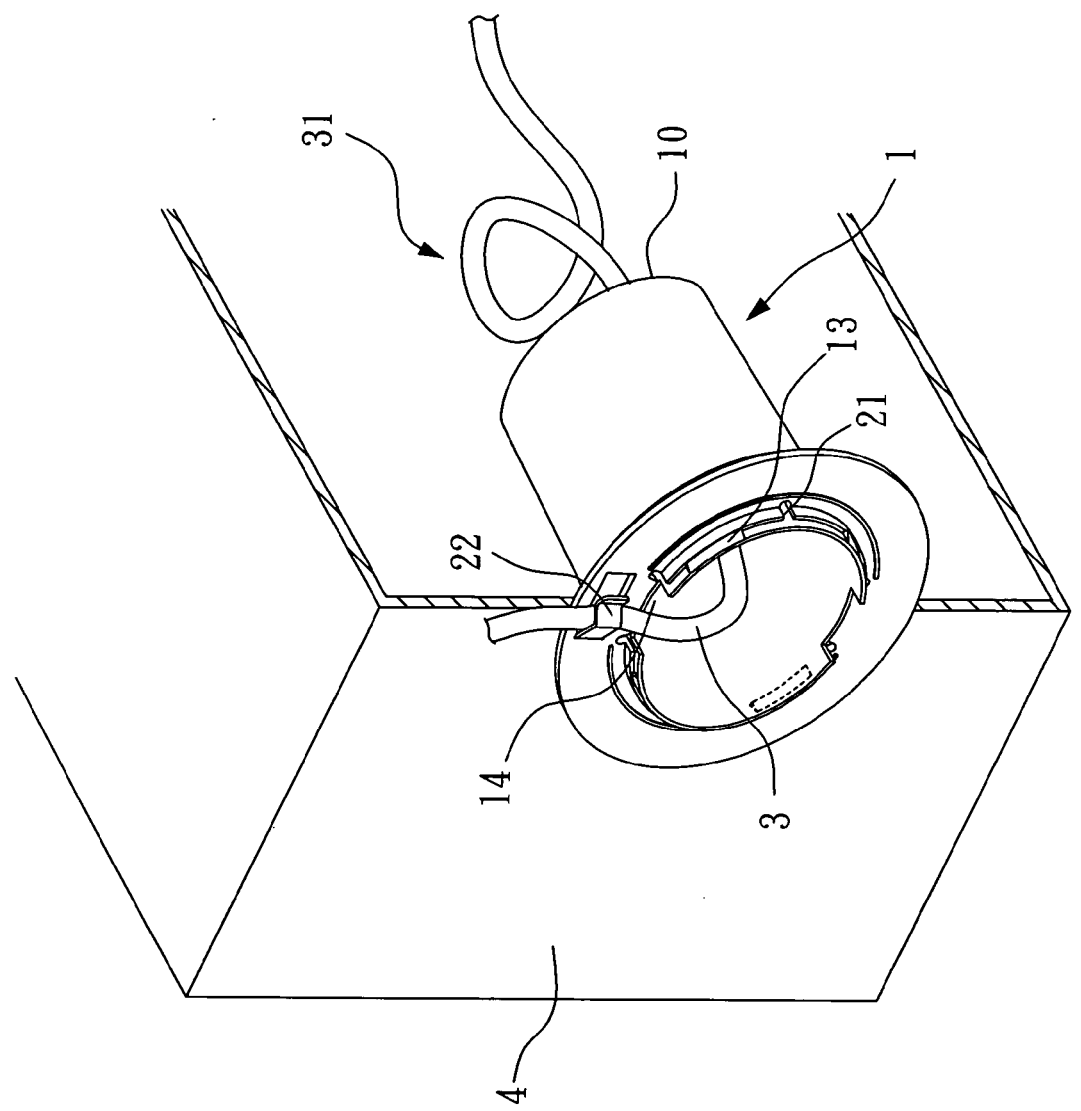
FIG. 3 is a perspective view illustrating the improved structure for a wire outlet cover according to the first embodiment of the present invention.

Referring to FIG. 2, an exploded view illustrating an improved structure for a wire outlet cover according to a first embodiment of the present invention, and to FIG. 3, a perspective view illustrating the improved structure for a wire outlet cover, the wire outlet cover is made of, for instance, polyethylene, and is arranged at a sidewall of a carton 4, where the carton 4 receives a network wire 3. The wire outlet cover comprises a body 1 having a hollow taper cylindrical shape and including an elliptical inlet end 10 and an elliptical outlet end 11, where the inlet end 10 has a bore smaller than that of the outlet end 11. The body 1 is, at the inlet end 10, provided with an inward-extended flange 12 having a curved edge; while is, at the outlet end 11 and at its external wall, provided with four stop blocks 13. Further, the body 1 is, near the outlet end 11 and at its external wall, provided with a stop flange 15 so as to divide the body 1 into a front body 101 and a rear body 111. Still further, a collar 2 has a hollow annular shape and is, at its upper surface, provided with two ribs 211; whereas is, at its internal edge 20, provided with four axially-extended edges 21. The collar 2 is assembled to the rear body 111, with the four axially-extended edges 21, flexibly, go over and stopped by the four stop blocks 13, such that the collar 2 and the stop flange 15 are spaced apart for a predetermined distance for receiving the sidewall of the carton 4.

As shown in FIG. 3, the collar 2 includes a wire-engagement hook 22, and that the body 1 is, at the outlet end 11 and corresponding to an internal side of the wire-engagement hook 22, provided with a recess 14. The network wire 3, when not used, can go through the recess 14 and be engaged and secured at the wire-engagement hook 22. This will prevent the network wire 3 from being bent so as to greatly decrease damage to the transmission property of the network wire 3. In addition, the bore of the inlet end 10 is greater than that of the prior art. Therefore, the network wire 3 can still pass through the body 1 without being stopped at the inlet end 10, even though a phenomenon of twist 31 occurs in the carton 4 when the network wire 3 is outgoing. In particular, the body 1 has a sufficient internal space for stretching the network wire 3 so that the same will not be bent seriously. As such, according to the technical contents of the present embodiment, the hollow taper cylindrical body 1 made of injection-molded polyethylene and the collar 2, the inlet end 10 having the inward-extended flange 12 with the curved edge, the recess 14 at the outlet end 11, and the collar 2 having the wire-engagement hook 22 and the ribs 211, can all help to smooth outgoing of the network wire 3 without causing a twist and damaging the transmission property of the network wire 3 so as to meet the environmental requirements and to have a high strength and durability.

Figure 4:
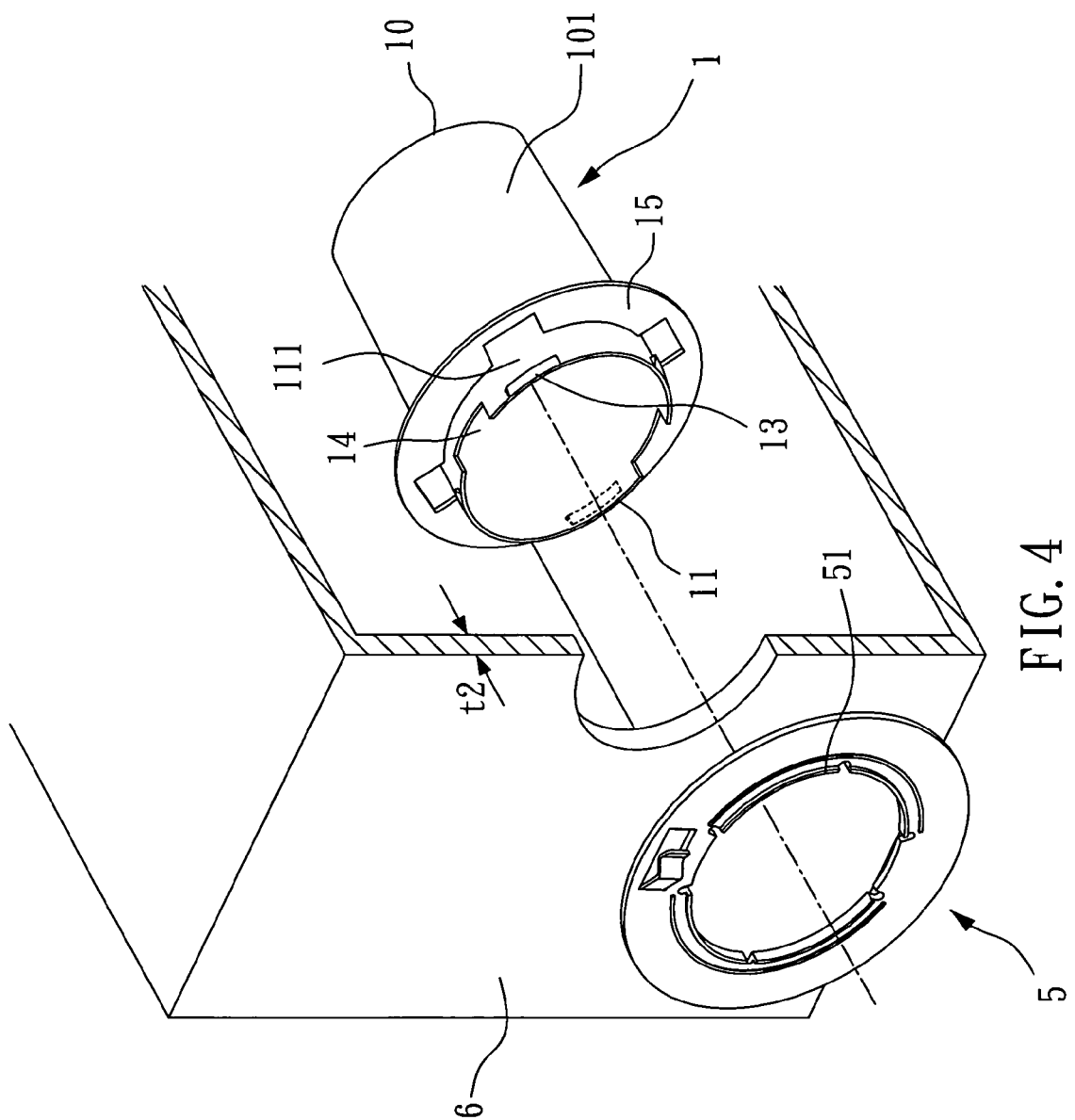
FIG. 4 is an exploded view illustrating an improved structure for a wire outlet cover according to a second embodiment of the present invention.

Now referring to FIG. 4, an exploded view illustrating an improved structure for a wire outlet cover according to a second embodiment of the present invention, the second embodiment has a structure similar to that of the first embodiment except that the former is provided with a collar 5 having four shorter axially-extended edges 51. This makes a predetermined distance, conforming to thickness t1 of the carton 4, between the collar 2 and the stop flange 15, as in the first embodiment shown in FIG. 2, shorter than another predetermined distance, conforming to another thickness t2 of a carton 6, between the collar 5 and the stop flange 15, as in the second embodiment shown in FIG. 4. As a result, in the second embodiment, the collar 5 and the stop flange 15 can receive the carton 6 having a greater thickness than the carton 4. As indicated above, this is because the axially-extended edges 51 are shorter than the axially-extended edges 21, leaving the result that the predetermined distance, conforming to the thickness t1 of the carton 4, is shorter than the another predetermined distance conforming to the thickness t2 of the carton 6. Therefore, the wire outlet cover, according to the present invention, can receive various thicknesses of cartons, as required, by changing the distances between the collars 2,5 and the stop flange 15.

Although the present invention has been explained in relation to its preferred embodiments, it is to be understood that many other possible modifications and variations can be made without departing from the scope of the invention as hereinafter claimed.

What is claimed is:

1. An improved structure for a wire outlet cover, arranged at a sidewall of a carton receiving a network wire, comprising:
    a body, having a hollow taper cylindrical shape, and including an inlet end and an outlet end, wherein the body is, at the outlet end and at its external wall, provided with a plurality of stop blocks, and wherein, the body is, near the outlet end and at its external wall, provided with a stop flange so as to divide the body into a front body and a rear body; and
    a collar, having a hollow annular shape, and being, at its internal edge, provided with a plurality of axially-extended edges, wherein the collar is assembled to the rear body, with the plural axially-extended edges stopped by the plural stop blocks, such that the collar and the stop flange are spaced apart for a predetermined distance for receiving the sidewall of the carton.

2. The improved structure for a wire outlet cover as claimed in claim 1, wherein both the inlet end and the outlet end of the body are elliptical.

3. The improved structure for a wire outlet cover as claimed in claim 1, wherein the inlet end has a bore smaller than that of the outlet end.

4. The improved structure for a wire outlet cover as claimed in claim 1, wherein the body is, at the inlet end, provided with an inward-extended flange.

5. The improved structure for a wire outlet cover as claimed in claim 4, wherein the inward-extended flange has a curved edge.

6. The improved structure for a wire outlet cover as claimed in claim 1, wherein the collar and the stop flange are spaced apart for a predetermined distance which conforms to thickness of the sidewall of the carton.

7. The improved structure for a wire outlet cover as claimed in claim 1, wherein the collar further includes a wire-engagement hook, and the body is, at the outlet end and corresponding to an internal side of the hook, provided with a recess, so that the network wire can be engaged and secured at the hook.

8. The improved structure for a wire outlet cover as claimed in claim 1, wherein the collar is, at its upper surface, provided with at least one rib.

9. The improved structure for a wire outlet cover as claimed in claim 1, wherein the wire outlet cover is made of polyethylene.

* * * * *